United States Patent [19]

Goglio

[11] Patent Number: 4,576,285

[45] Date of Patent: Mar. 18, 1986

[54] SEALED FLEXIBLE CONTAINER WITH NON-DESTRUCTIVE PEELABLE OPENING AND APPARATUS AND METHOD FOR FORMING SAME

[75] Inventor: Luigi Goglio, Milan, Italy

[73] Assignee: Fres-co System USA, Inc., Telford, Pa.

[21] Appl. No.: 584,587

[22] Filed: Feb. 29, 1984

Related U.S. Application Data

[63] Continuation-in-part of Ser. No. 496,770, May 20, 1983, Pat. No. 4,518,087.

[51] Int. Cl.$^4$ .............................................. B65D 33/16
[52] U.S. Cl. .................................................... 206/632
[58] Field of Search ................... 206/632, 484; 383/93, 383/94, 95

[56] References Cited

U.S. PATENT DOCUMENTS

| | | | |
|---|---|---|---|
| Re. 30,726 | 9/1981 | Otten et al. | 206/601 |
| 3,186,628 | 6/1965 | Rohde | 229/66 |
| 3,410,393 | 11/1968 | Lee | 206/632 |
| 3,511,436 | 5/1970 | Kessler | 206/632 |
| 3,511,746 | 5/1970 | Davies | 206/632 |
| 3,535,409 | 10/1970 | Rohde | 264/95 |
| 3,595,468 | 7/1971 | Repko | 206/632 |
| 3,613,874 | 10/1971 | Miller | 206/632 |
| 3,939,972 | 2/1976 | Mayworm | 206/219 |
| 4,145,449 | 3/1979 | Nelham | 206/632 |
| 4,279,344 | 7/1981 | Holloway | 206/631 |

Primary Examiner—Stephen P. Garbe
Attorney, Agent, or Firm—Caesar, Rivise, Bernstein & Cohen, Ltd.

[57] ABSTRACT

Containers formed of a flexible sheet of material capable of being sealed for closing off the interior of the container from the ambient atmosphere. The sheet material is resistant to tearing and includes an inner surface and an outer surface. The container comprises a mouth portion including a peel strip or layer fixedly secured to the inner surface of the material and extending substantially the entire length of the mouth portion, with adjacent portions of the peel strip or layer being in releasable engagement with each other. The engagement forms an air-tight interfacial seal at the mouth which is readily openable by peeling the engaging portions of the peel strip or layer from each other to provide ready access to the interior of the container without tearing the sheet material forming the container. Thus, the container can be readily reclosed by conventional mechanical means, such as folding, tin ties, etc.

Some containers are formed in accordance with the method for applying the peel strips transversely across a web of sheet material and heat sealing the strips to the material at longitudinally spaced locations and thereafter severing the web into sections which are formed into the container. Other containers are formed by use of a peel layer on the entire inner surface of the container. The peelable interfacial seal for such containers is formed by heat sealing the same within a desired temperature range. The remaining seams of the container are permanent and are formed by heat sealing the same at temperatures in excess of those used in making the peelable seal.

5 Claims, 10 Drawing Figures

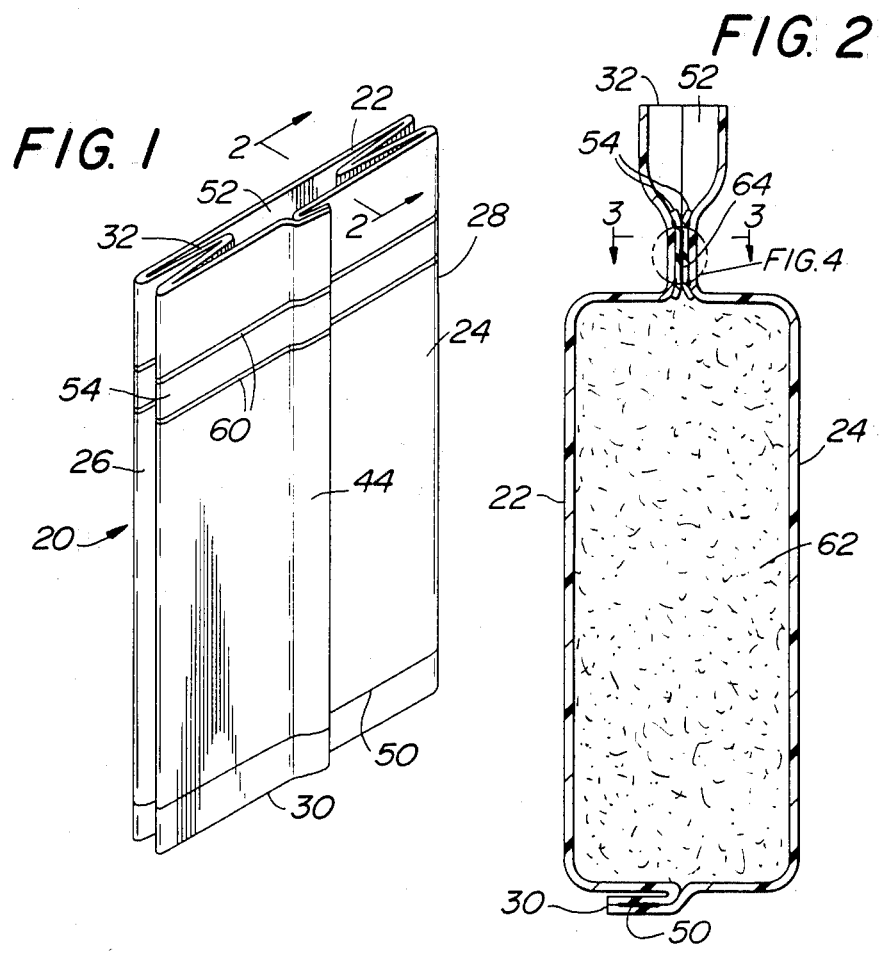
FIG. 1
FIG. 2
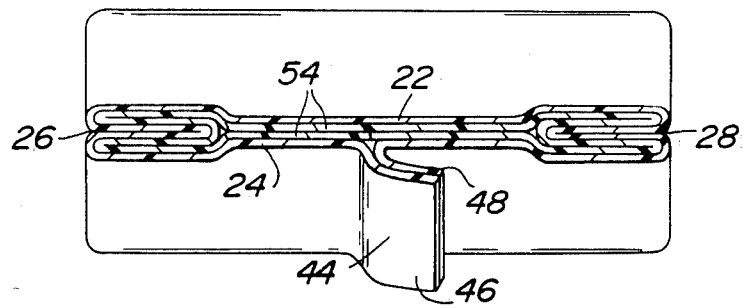
FIG. 3

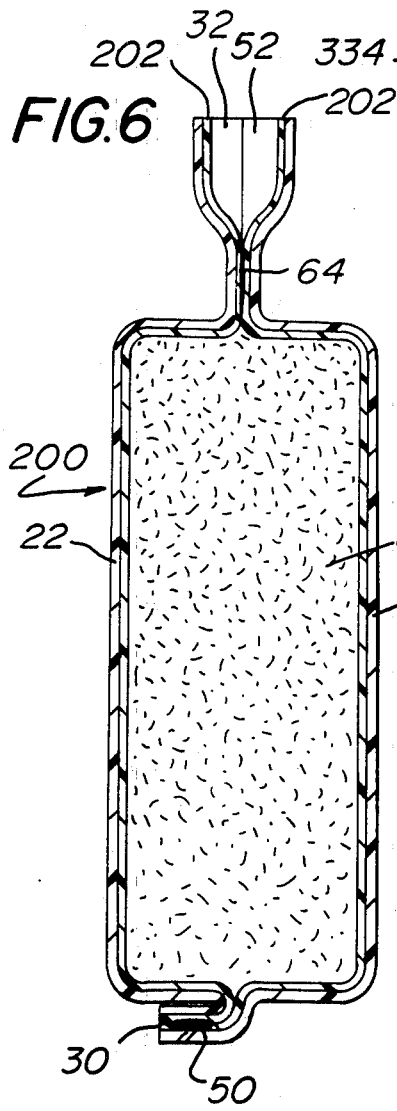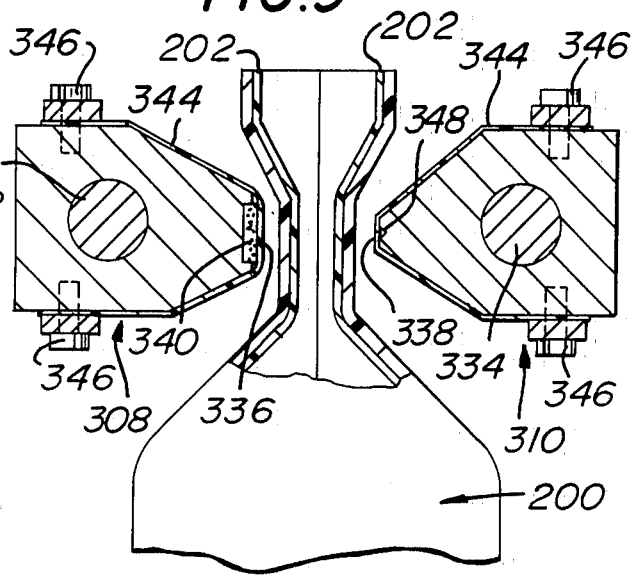

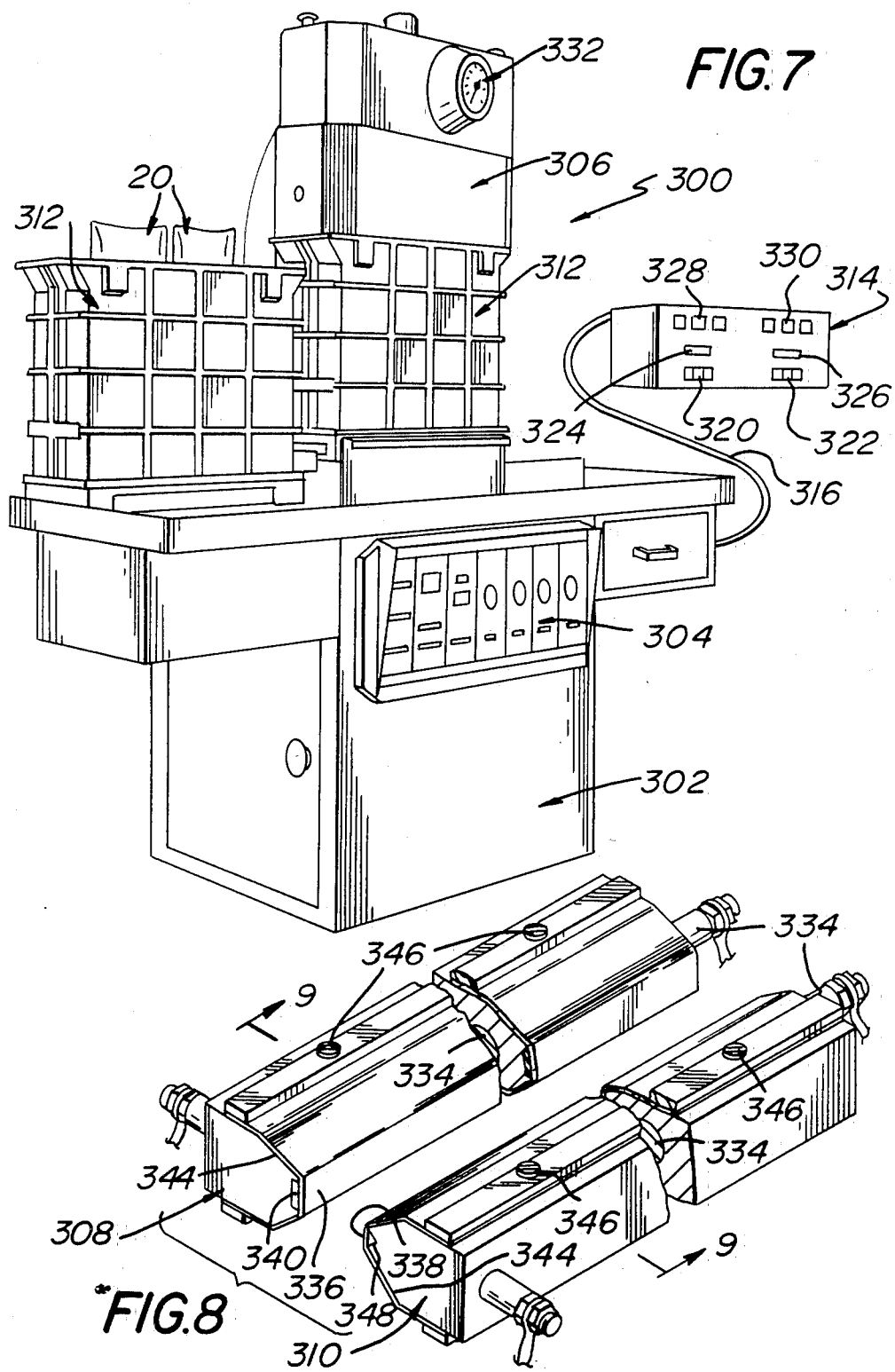

SEALED FLEXIBLE CONTAINER WITH NON-DESTRUCTIVE PEELABLE OPENING AND APPARATUS AND METHOD FOR FORMING SAME

BACKGROUND OF THE INVENTION

This application is a continuation-in-part of my co-pending U.S. patent application Ser. No. 496,770 filed on May 20, 1983, now U.S. Pat. No. 4,518,087 entitled Sealed Flexible Container with Non-Destructive Peelable Opening, whose disclosure is incorporated by reference herein.

This invention relates generally to containers and, more particularly, to containers formed of flexible sheet materials.

Flexible containers formed of sheet materials have been used for several years and are now gaining ever wider acceptance for holding various air-perishable products, e.g., foodstuffs, etc. Prior art flexible, air-tight containers are commonly constructed of some plastic film, metal foil, or combinations thereof, in one or more plies and sealed along one or more seams. Such containers are usually vacuumized after filling but prior to sealing so that the contents of the container are not exposed to the degradation effects of air. Accordingly, products held in such containers can have a shelf life comparable to rigid containers, such as jars with screw-on lids or metal cans.

The advantages of flexible containers over rigid containers are many. For example, flexible containers can be manufactured at substantially lower cost and can be stored flat, thereby resulting in enormous space savings over rigid containers. Moreover, flexible containers are substantially lighter in weight, thereby resulting in reduced transportation costs for unfilled containers. Further still, flexible containers are generally of an overall parallelopiped shape when filled so that such containers take up considerably less shelf or storage space. Needless to say, this feature is of considerable importance insofar as transportation, storage, and display are concerned.

While prior art air-tight, flexible containers exhibit the aforementioned advantages over rigid containers, they still have not proved a completely acceptable alternative to hard containers for the air-tight storage of materials, particularly when it is desired to be able to open and reclose the container after its initial opening. In this regard, the seams of prior art flexible containers are usually permanent in the interest of air tightness and structural integrity and are commonly formed by conventional heat sealing or welding techniques. Thus, the prior art flexible container is opened by cutting or tearing one or more of its seams. Owing to the permanent nature of the sealed seams, the tearing of any seam to gain access to the contents of the container not only destroys the seal but frequently results in the tearing of the material of the container contiguous with the seam. This is an obviously undesirable result since it may render the container useless for reclosure and continued holding of the contents of the container. If the container is opened by cutting off its top below the heat seal line, while the wall portions forming the container are not torn (thus permitting reclosure), the container is nevertheless shorter and thus of lower volumetric capacity.

Various flexible packaging structures have been disclosed in the prior art utilizing tear strips and/or tear lines to facilitate opening of the container. Examples of such patents are U.S. Pat. Nos. 3,186,628 (Rohde), 3,535,409 (Rohde), and 3,939,972 (Mayworm).

In the U.S. Pat. No. Re. 30,726 (Otten et al.), there is disclosed a pouch composed of an extruded polymer film formed by a blend of polyethylene resin and an ionomer.

The pouch is formed by extruding the polyethylene/ionomer blend into a continuous tubular film which exhibits a linear tear property in the machine direction. By linear tear property, it is meant that the material has the inherent property to tear readily by hand along the substantially straight line by a normal shearing or parting motion without the need for guiding the tear. The tubular film is then slit longitudinally, cut into transverse sections, and heat sealed adjacent the transverse cuts to form a bag or pouch having an open top end. After the pouch is filled, the open top end is heat sealed to close the pouch. By virtue of the orientation of the film, the resulting pouch exhibits a linear tear property across its top end. To facilitate the opening of the pouch across its top, one edge of the pouch adjacent the top is slit or nicked to provide a starter tear. Thus, opening of the pouch is accomplished by tearing the top off of the pouch.

While such action may be effective to provide ready access to the interior of the pouch, the tearing away of the top portion of the pouch limits the pouch's utility for being reused and reclosed at its top end.

OBJECTS OF THE INVENTION

Accordingly, it is the general object of the instant invention to provide a flexible material container and a method of producing the same which overcomes the disadvantages of the prior art.

It is a further object of the invention to provide a flexible container having an air-tight sealed mouth but which can be readily peeled open without resulting in the destruction of any portion of the container, thereby enabling the container to be reclosed.

It is still a further object of this invention to provide a flexible container having a mouth which is sealed by a peelable interface between abutting wall portions of the container and which interface can be readily peeled open without destroying any portion of the container.

It is still a further object of this invention to provide a flexible container which is resistant to tearing or opening at all portions thereof but which includes a mouth having an air-tight interfacial seal which can be readily peeled open.

It is yet a further object of this invention to provide a method for producing a flexible container having an air-tight sealed mouth which can be readily peeled open without resulting in the destruction of any portion of the container.

It is still a further object of this invention to provide a simple and economically viable method of producing a flexible container which is sealed by a peelable interface between abutting wall portions of the container and which interface can be readily opened without destroying any portion of the container.

SUMMARY OF THE INVENTION

These and other objects of the instant invention are achieved by providing a container and a method for making the container. The container comprises a flexible sheet material capable of being sealed for closing off the interior of the container from the ambient atmosphere. The sheet material is resistant to tearing and includes an inner surface and an outer surface. The container comprises a mouth portion including peel strip means fixedly secured to the inner surface of the material and extending substantially the entire length of the mouth portion. Adjacent portions of the peel strip means are in releaseable engagement with each other to form an air-tight interfacial seal at the mouth. The interfacial seal is readily openable by peeling the engaging portions of the peel strip means from each other to provide ready access to the interior of the container without tearing the sheet material forming the container.

DESCRIPTION OF THE DRAWING

Other objects and many of the attendant advantages of this invention will be readily appreciated as the same becomes better understood by reference to the following detailed description when considered in connection with the accompanying drawings wherein:

FIG. 1 is a perspective view of an exemplary embodiment of a container constructed in accordance with the teachings of the subject invention;

FIG. 2 is an enlarged sectional view of a filled, sealed container, like that shown in FIG. 1, and taken along line 2—2 of FIG. 1;

FIG. 3 is a sectional view taken along line 3—of FIG. 2;

FIG. 6 is a sectional view, like that of FIG. 2, but showing an alternative embodiment of a container constructed in accordance with the teachings of the subject invention;

FIG. 7 is a perspective view of apparatus for forming the containers of this invention;

FIG. 8 is an exploded perspective view, partially in section showing a pair of heat sealing jaws of the apparatus shown in FIG. 7;

FIG. 9 is a cross-sectional view of the jaws of the apparatus shown in FIG. 7 immediately prior to sealing the mouth of the container shown in FIG. 6; and FIG. 10 is a view similar to FIG. 9 during the sealing operation.

DETAILED DESCRIPTION OF THE PREFERRED EMBODIMENTS

Figure 4:
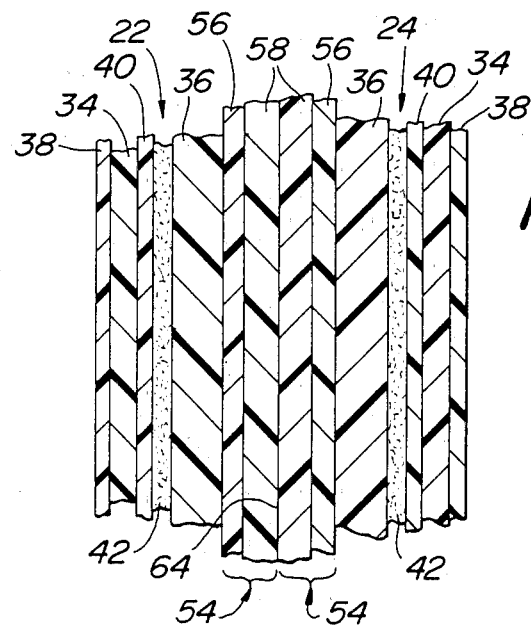
FIG. 4 is an enlarged sectional view of a portion of the container shown within the encircled area in FIG. 2.

Referring now in greater detail to the various figures of the drawing where like reference characters refer to like parts, there is shown generally at 20 in FIG. 1 the container formed of a flexible sheet material constructed in accordance with the instant invention.

The container 20 is formed of a sheet of flexible material, to be described later, and basically comprises a front wall 22, a rear wall 24, a first gussetted sidewall 26, a second gussetted sidewall 28, a bottom end 30, and a top end 32. The front wall 22, rear wall 24 and gussetted sidewalls 26 and 28 are all integral portions of a single sheet of flexible material which has been folded and seamed as will be described later.

In accordance with the subject invention, the flexible material can be formed of any commercially available flexible material heretofore used for forming flexible packaging. Examples of such materials are polyethylene, polyester, polypropylene, metal foil, and combinations thereof in single or multiple plies.

In the embodiment of the invention disclosed herein, the sheet material forming the front wall 22, back wall 24, and gussetted sidewalls 26 and 28 of the container 20 are formed of cellophane-polyethylene. It must be pointed out at this juncture that such material is merely exemplary and hence other materials can be used depending upon the desired characteristics for the container.

The exemplary embodiment of the sheet material forming the bag 20 is shown in considerable detail in the sectional view of FIG. 4. As can be seen therein, the sheet material consists of two plies, namely, a cellophane ply 34 and a polyethylene ply 36. The cellophane ply is coated on both sides with polyvinylidene chloride. Thus, the outer surface of cellophane ply 34 includes a polyvinylidene chloride coating 38, while the inner surface includes a polyvinylidene chloride coating 40. The coated cellophane ply 34 is secured to the polyethylene ply 36 via an interposed adhesive layer 42.

As can be seen in FIG. 1, the back wall 24 of the bag 20 includes a longitudinally extending (vertical) seam 44. The seam 44 is formed by the marginal edges 46 and 48 of a section of a web of the material forming the bag and which edges are brought into engagement with one another. The edges 46 and 48 are permanently secured to one another via any conventional sealing technique, such as heat sealing, welding, etc. The bottom end 30 of the bag is also sealed closed along a permanent seam line 50. The seam line 50 is also formed using conventional sealing techniques, like that used for the seam 44.

The resulting construction thus consists of a bag or pouch-like container having an open top end or mouth 52. It is through the open top end or mouth that the container is filled.

In accordance with the subject invention, the container 20 includes peel strip means 54, to be described in considerable detail later, disposed adjacent the mouth for sealing the mouth of the container to enclose the contents therein and protect the contents from the ambient atmosphere. The peel strip means serves as a mechanism which can be readily peeled open without destroying the container to provide ready access to the interior of the container. Thus, the container 20 of the subject invention can be reclosed after its initial opening.

The containers 20 of the instant invention are produced by one of two methods, namely, the manufacture, filling, and sealing of the container in one operation by mechanized equipment, or the manufacture of an empty and unsealed container which is then provided to the end user for filling and subsequent sealing. Both of said methods are a part of the subject invention and will be described in detail later.

As can be seen in FIGS. 1-4, the peel strip means 54 basically comprises a strip of material which is permanently secured to the inside surface of the sheet material forming the front wall, sidewalls, and back wall of the container 20. The strip 54 is located adjacent the open mouth 52 and thus extends about the entire inner periphery of the container (with the exception of the marginal edges forming seam 44) and is permanently secured thereto.

The strip means 54 is formed of any material which can be secured to itself via heat sealing or welding to provide an air-tight interface, but which can be readily peeled apart at its interface without destroying the material thereof. It has been found that a suitable plastic film for the strip 54 consists of a blend of polyethylene and an ionomer like that sold by E. I. DuPont DeNemours & Company under the Trademark "SURLYN 1601" such as described in U.S. Pat. No. Re. 30,726 identified heretofore, and whose disclosure is incorporated by reference herein. Other ionomers disclosed in said patent or other plastic materials having similar characteristics to those disclosed therein may also be used.

In a preferred embodiment of the subject invention, the peel strip means 54 consists of a coextrusion (i.e., a two-layer construction), one layer being a polyethylene-Surlyn blend and the other layer being polyethylene. Thus, as can be seen in FIG. 4, the peel strip means 54 consists of inner ply 56 formed of polyethylene and outer ply 58 formed of a blend of polyethylene-Surlyn. The strip 54 completely encircles the inner surface of the sheet material forming the container adjacent the container's mouth 52 but does not extend into the seam 44 in the interest of maintaining the integrity of the seam when the container is later opened. The peel strip 54 is secured in place on the inner surface of the container adjacent its mouth 52 via a pair of longitudinally extending peripheral heat seals or welds 60. Each heat seal or weld is located parallel and closely adjacent the respective edge of the strip 54 and produced in a conventional manner by means to be described later.

As should thus be appreciated, the completed container as shown in FIG. 1 includes an inwardly directed layer of a peelable polyethylene-Surlyn blend 58 adjacent its mouth. The contiguous surface portions of the peelable layer 58 are disposed opposite each other for engagement with each other to seal the mouth of the container 20. Accordingly, after the container is filled with the desired contents 62 and then vacuumized to remove any air from the interior thereof, the opposed peel strip surface portions 58 are brought into engagement with each other (as shown in FIGS. 3 and 4) and heat sealed. This action causes the opposed strip portions 58 to become releaseably secured to one another at an air-tight yet weakened interfacial seal 64 (FIG. 4). This interfacial seal, while air-tight, can be readily peeled open without damaging the strips 58 or the material forming the container's walls 22, 24, 26, and 28. Thus, all that is required to open the container is to apply a force at the top end 32 tending to separate the front wall 22 from the rear wall 24. This action causes the abutting peelable surfaces 58 to readily peel away from each other along the interface 64 in a clean opening and without in any way damaging the walls of the container. Accordingly, one can readily gain access to the interior contents 62 of the container 20. Moreover, inasmuch as the container is intact, albeit open, one can readily reclose the bag (although not with an air-tight seal), by merely bringing the mouth's wall surfaces 22, 24, 26, and 28 into engagement with one another, folding the top edge of those surfaces over and holding the folded edges in place with mechanical means, e.g., a tin tie (not shown) which can be incorporated into the container's walls adjacent the mouth.

In accordance with the preferred embodiment of the invention, the peelable strip means 54 is located a substantial distance below the top of the container to provide the fold or mechanical securement area for reclosure of the container after the peel strip 54 has been opened.

As will be appreciated by those skilled in the art, the sealing operation can be accomplished through the use of an opposed pair of heated jaws. Moreover, where the container to be sealed is of the gussetted type (in which there are more overlapped layers at the sides than at the middle of the container-as shown in FIG. 3) the use of one resilient jaw and one non-resilient jaw is preferred to ensure even pressure across the container during the sealing operation.

The perameters (e.g., pressure, temperature and dwell time) of the heat sealing operation to result in the peelable seal using the peel strip means 54 as disclosed herein are readily determinable by those skilled in the art and the following table sets forth the range of such perameters found effective to produce a one-eighth inch (3.2 mm) width seal:

SURFACE TEMPERATURE

Resilient Jaw: 150° C.–185° C.
Non-Resilient Jaw: 130° C.–145° C.

PRESSURE

420–450 P.S.I.

DWELL TIME

3–6.5 seconds

If two resilient jaws are utilized, the temperature range is 134°–136° C. with a dwell time of approximately three seconds and a pressure range of 420–450 P.S.I.

Figure 5:
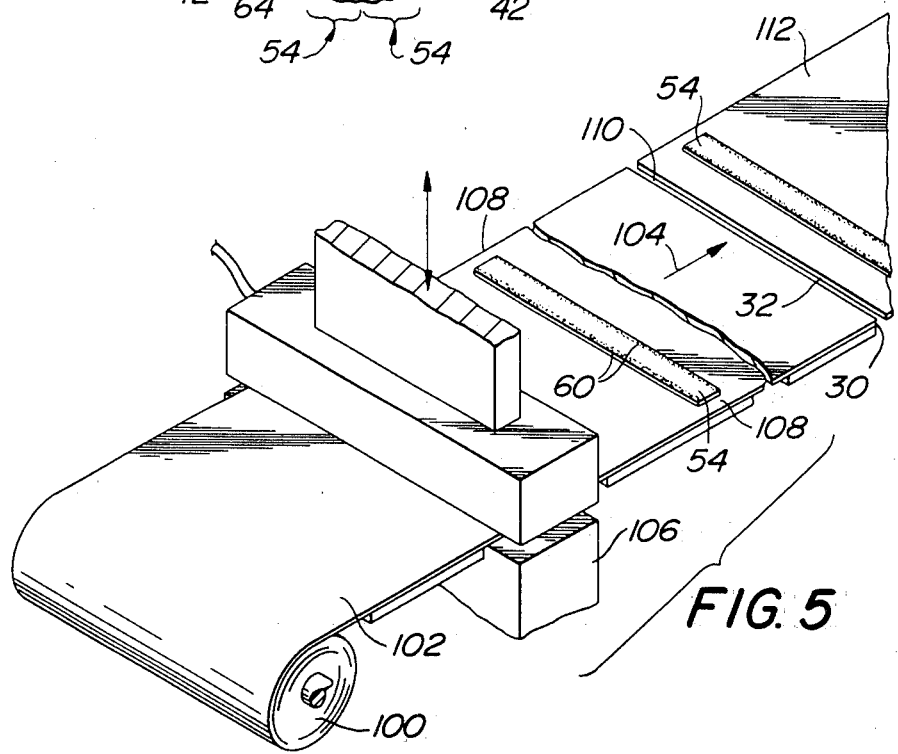
FIG. 5 is a perspective view, greatly simplified, of a system for forming the container shown in FIG. 1.

In FIG. 5 there is shown, in schematic form, apparatus for producing containers constructed in accordance with the instant invention. Accordingly, the container-making system comprises a roll 100 of the sheet material forming the container's walls. The material is reeled off the roll in a web 102, which web is carried longitudinally in the direction of arrow 104 past a peel strip application station 106. The peel strip application station 106 forms only one portion of the entire container-forming system (not shown) and is arranged to apply a plurality of peel strips 54 (like that disclosed heretofore) at equidistantly spaced locations along the web 102 passing thereby. As can be seen in FIG. 5, each strip 54 extends for substantially the entire width of the web 102 except for a marginal edge portion 108 on each side of the strip. The marginal edge portion form the edge portions 46 and 48 of the container's vertical seam 44 (as described heretofore).

Each strip 54 is secured to the web 102 by heat sealing it along the parallel heat seal line 60 at station 106. The web is then severed across its full width at a cut line 110. The cut line 110 serves to divide the web 102 into plural sections 112, each of which is thereafter formed (folded) into the container 20. Thus, the cut line 110 forms the top edge 32 of the section 112 forming one container and a bottom edge 30 of the section 112 forming the next succeeding container. Each cut section 112 of the web is thereafter supplied to apparatus (not shown) which forms the section into a tube and brings the marginal edge 108 of each section into engagement with each other to form and heat seal or weld the seam 44. The resulting tubular construction is thereafter heat sealed or welded along seam 50 adjacent its bottom edge 30 by means (not shown) to complete an open container like that shown in FIG. 1.

At this point, the container 20 may be removed from the system and packaged for supply to a processor for subsequent filling and sealing the containers. Alternatively, the system forming the container may fill it and seal it in one operation. Thus, with the latter system, the container 20, after being formed into the construction shown in FIG. 1, is filled with its contents 62 and vacuumized. The peel strip means 54 is then closed and hermetically sealed, as described heretofore, to isolate the contents 62 within the interior from the ambient atmosphere. The top edge 32 is then folded down or left upright, as desired.

It must be pointed out at this juncture that while in the preferred embodiment of the invention shown in FIG. 1 herein the peelable closure 54 comprises a strip which is fixedly secured to the inner surface of the container adjacent its mouth by a pair of seals, this invention is not limited to that construction. Hence, the closure strip can be secured in place by any means.

Moreover, the strip need not even be separate from the sheet material forming the container and can thus be applied as a layer (such as described later) or coating strip on the inner surface of the sheet material before it is formed into the container. Further still, the strip need not consist of two plies or layers and thus may be in the form of a single ply or layer or multi-plies or layers of the same or different type materials.

In FIG. 6 there is shown an alterntive container 200 constructed in accordance with this invention. The container 200 is similar to container 20 in most respects and thus its common features are given the same reference numerals as those of container 20. However, the major difference between container 200 and container 20 is that the peelable sealed interface 64 at the mouth of the container 200 is formed by abutting portions of a layer 200 covering the entire inner surface of the walls of the container. The layer 200 is formed of the same peelable strip material as the strip means 54 described heretofore with reference to container 20. The remaining seams of the container 200, that is, the vertical rear wall seam (not shown) and the horizontal bottom wall seam 50, are permanent, that is, are not peelable, notwithstanding the fact that such seams are made at container portions having the same material layer 200 as at the mouth of the container. The permanent seams are formed by the application of more heat to the seams during the fabrication of the container than applied to make the peelable seal at the mouth and as described heretofore. In this connection, it has been found that temperatures in slight excess of the ranges set forth heretofore will result in a permanent seal for the embodiment disclosed herein.

One apparatus for forming the peelable mouth seals as well as the permanent seam seals of the containers of this invention is shown in FIG. 7 and denoted by the reference numeral 300. Apparatus 300 is a generally conventional vacuum packing machine, such as that sold by Goglio Luigi—Milano—S.P.A. of Milan, Italy and designated as Model GL9, which has been modified through the use of different heat sealing jaws and use of an auxiliary control panel (both to be described later) to effectuate the efficient and economical sealing of containers formed in accordance with the subject invention. Thus, as can be seen, the vacuum packaging machine 300 basically comprises a base-table 302 on the front wall of which a control panel 304 is mounted. Disposed above the table is a sealing head in which a pair of heat sealing jaws 308 and 310 (FIG. 8) are disposed. The jaws, which will be described in detail later, are arranged to be brought into engagement with the opposite sides of the container at the mouth thereof to form the peelable seal mouth as described heretofore. Moreover, the jaws 308 and 310 are also used to form the permanent seals (seams) of the container by disposing the portion of the container forming those seals between the jaws.

The apparatus 300 also includes plural vacuum chambers 312. These vacuum chambers are each hollow members arranged to support therein containers constructed in accordance with the subject invention and filled with a material to be sealed therein, e.g., coffee. The chambers are arranged to cooperate with the head 306 to form a vacuum chamber so as to evacuate air from the containers being sealed prior to sealing thereof. The sealing occurs under vacuum. Control of the sealing operation is effected via the control panel 304. Apparatus 300 also includes an additional or auxiliary control panel 314. The auxiliary control panel 314 is connected via a cable 316 to the apparatus 300 and is arranged to provide means for individually adjusting the temperature of the two sealing jaws 308 and 310. The auxiliary control 314 thus provides dual temperature control for the apparatus. Adjustment of the temperature for the two jaws is established by the setting of respective digital temperature dial switches 320 and 322 of control 314. Display means in the form of analog temperature indicators 324 and 326 are disposed on the front panel of the control 314 to display the temperature of the associated jaws. Additional indicators 328 and 330, in the form of indicator lamps, are also provided in control 314. The electrical connections and components as well as the hydraulic components of the system are located within the table-base 302.

A vacuum gauge 332 is located on the head 306 to display existing vacuum within the chambers 312.

Referring to FIG. 8, the details of the jaws 308 and 310 will now be discussed. As can be seen, each jaw basically comprises an elongated metal bar through which an elongated electrical cartridge heater 334 extends. The cartridge heater is in thermal engagement with the body of the bar so that there is a good thermal transfer therebetween, whereupon the temperature of the bar can be precisely controlled. The temperature of each bar is established by the setting of the associated temperature switches 320 and 322 on control panel 314. As can be seen, bar 308 includes a tapered inner surface terminating in a planar working face 336. In a similar manner, the bar 310 includes a tapered front face terminating in a working face 338. As can be seen, the working face 338 is substantially narrower than working face 336 inasmuch as working face 338 is non-resilient while working face 336 is resilient. To that end, the working face 336 includes a rubber strip 340 extending down a channel 342 along the full length of the jaw 308. A covering of Teflon-coated glass fabric 344 is disposed over the face 336 of jaw 308 and is held in place via securement means 346. The non-resilient jaw 310 includes a slight notch extending down the length of the jaw at its front face 338. The jaw 310 is also covered by a Teflon-coated glass fabric 344 which is held in place by fasteners 346 in the same manner as described with reference to jaw 308. The narrow front face 338, jaw 310, includes a V-shaped notch 348 extending down the length thereof.

Operation of the jaws to seal the mouth of the container 200 to form the peelable interface 64 is shown in FIGS. 9 and 10. As can be seen therein, the portion of the container 200 adjacent the mouth is disposed between the jaws 308 and 310 as shown in FIG. 9. The jaws are then brought together to squeeze the opposing portions of the container into engagement with each other as shown in FIG. 10. This action causes the resilient jaw to "give" slightly opposite the non-resilient jaw to ensure that even pressure is applied thereacross. Moreover, as will be appreciated by those skilled in the art, the use of the resilient jaw ensures that a proper seal is effected across the entire bag, notwithstanding the presence of the additional folds caused by the gussetts at the sides of the bag (not shown in FIGS. 9 and 10).

As should be appreciated from the foregoing, the containers of the subject invention provide a viable alternative to the use of rigid containers for the air-tight storage of materials and without the disadvantages of prior art flexible containers, namely, either the inability to be readily reclosed due to structural damage to the container due to the tearing of its walls or, if the container is cut open at its seal, the reduction in storage capacity due to the removal of the top of the container. The advantages of the subject invention over the prior art are accomplished in a simple and expeditious manner through the use of a peelable closure at the mouth of the container which creates an air-tight weakened seal that can be peeled open without damaging the container itself.

Moreover, the method(s) of the subject invention provides a viable and commercially feasible means for readily and inexpensively producing flexible containers having air-tight peelable mouths with other seamed portions being permanent seams.

Without further elaboration, the foregoing will so fully illustrate my invention that others may, by applying current or future knowledge, readily adapt the same for use under various conditions of service.

I claim:

1. A sealed container comprising a flexible sheet material closing off the interior of the container from the ambient atmosphere, said sheet material being resistant to tearing, said container having an opposed pair of walls formed by said sheet material, each of said walls including an inner surface and an outer surface, said container comprising a releaseably sealed mouth portion formed between said walls and of a predetermined length, each of said walls including a first layer on said entire inner surface, said first layer comprising at least two plastic material layers permanently adhered to each other, a portion of one of said first layers at said mouth portion on one of said walls being disposed opposite to a corresponding portion of the first layers at said mouth of the other of said walls, said mouth portion being sealed by the application of a predetermined amount of energy thereto, whereupon portions of the same plastic layer of each of said first layers join in releaseable engagement with each other to form an air-tight interfacial seal therebetween for the entire predetermined length of said mouth portion, said interfacial seal being readily openable by peeling said engaging portions of said first layers from each other to provide ready access to the interior of said container through said mouth portion without tearing said sheet material, said container additionally comprising at least one permanently sealed seam formed by the application of energy in excess of said predetermined amount to other abutting portions of said first layers of said walls.

2. The container of claim 1 wherein one of said layers comprises a blend of polyethylene and ionomer.

3. The container of claim 2 wherein said first layer comprises a layer of polyethylene and a layer of said blend of polyethylene and ionomer.

4. The container of claim 1 wherein said releaseable seal of said layers at said mouth is formed by a heat seal therebetween.

5. The container of claim 4 wherein said permanently sealed seam is formed by a heat seal.

* * * * *